United States Patent Office 2,700,748
Patented Jan. 25, 1955

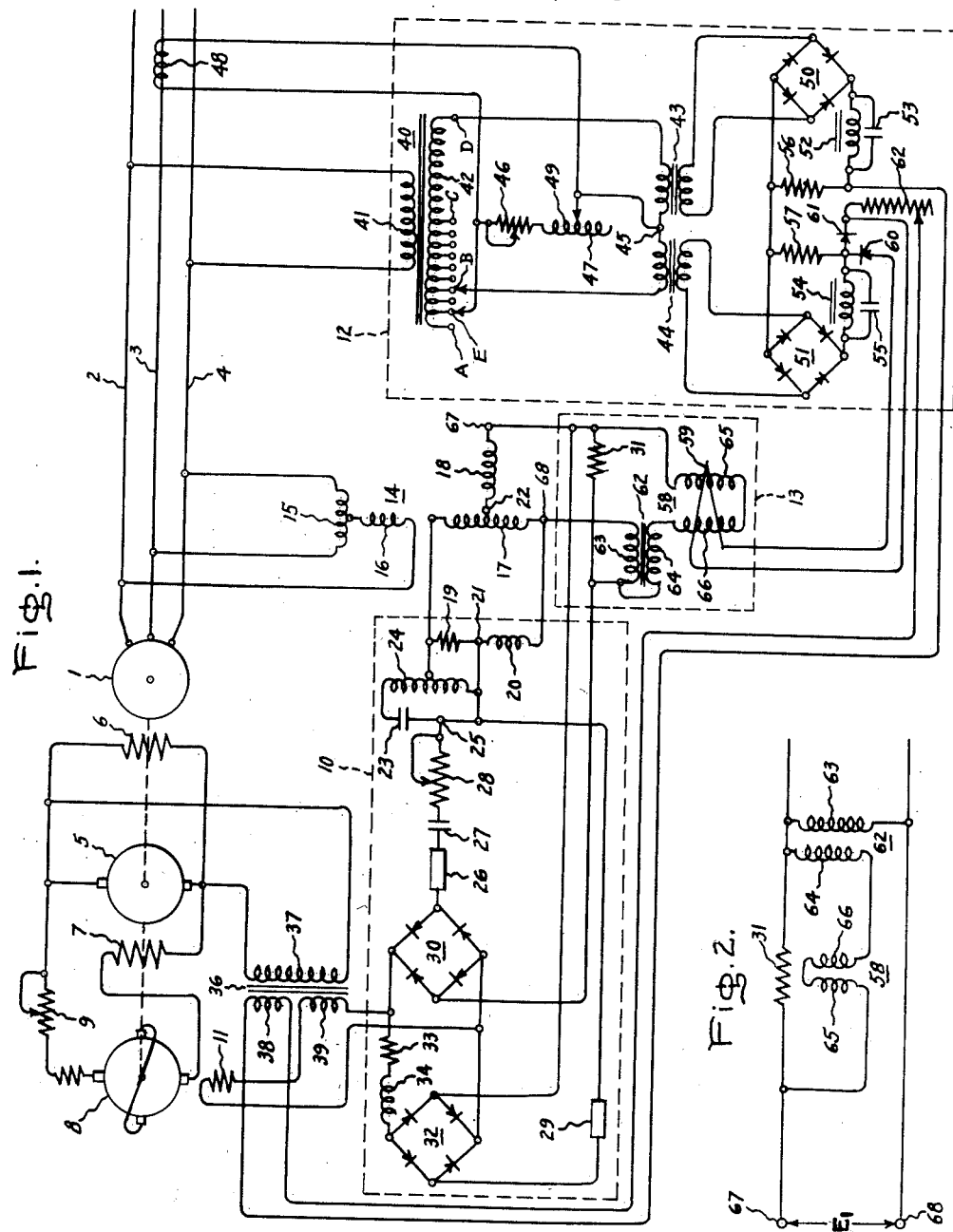

2,700,748

REGULATOR FOR DYNAMOELECTRIC MACHINES

Harold H. Britten and Melville E. Hartman, Schenectady, N. Y., assignors to General Electric Company, a corporation of New York Application February 1, 1951, Serial No. 208,908

12 Claims. (Cl. 322—19)

This invention relates to regulator systems for dynamoelectric machines such as synchronous motors and generators, and more particularly to regulator systems of the reactive kilovolt-ampere limiting type disclosed in Patent 2,478,623 Selden B. Crary and Melville E. Hartman, issued August 9, 1949, which is assigned to the assignee of the present application.

The principal object of the present invention is to provide a more accurate, sensitive, and stable regulator system of the type disclosed in this patent.

Further objects and advantages of the invention will be apparent from the subsequent detailed description of a preferred embodiment of the invention, while the scope of the invention is defined in the appended claims.

In carrying out our invention in one form, we provide a regulator system which includes automatic regulating means for controlling the field excitation of a generator in order to maintain the terminal voltage of the generator constant. Also included in the regulator system is a circuit which is responsive to reactive kilovolt-amperes in the generator, while a third portion of the regulator system is a recalibrating circuit which interconnects the automatic voltage regulating means and the reactive kilovolt-ampere responsive circuit. During normal operation the reactive kilovolt-ampere responsive circuit and the recalibrating circuit do not affect the operation of the automatic voltage regulating means. If, however, the voltage regulator should for any reason attempt to reduce the generator excitation to such an extent that the underexcited reactive kilovolt-amperes produced by the generator tend to exceed the critical value at which the generator pulls out of step, the reactive kva. responsive circuit acting through the recalibrating circuit modifies the action of the automatic voltage regulator and prevents such a reduction in excitation.

For a clearer and more complete understanding of our invention, reference should be had to accompanying drawing, in which Fig. 1 is a diagrammatic representation of a preferred embodiment of the invention for use with an alternating current generator, while Fig. 2 is a schematic diagram of the recalibrating circuit portion only of the regulator system of Fig. 1.

Referring to the drawing, there is shown, by way of example, a regulator system for a three phase alternating current generator 1 which is connected to energize three terminal conductors 2, 3 and 4. A direct current exciter 5, which may be direct connected as illustrated or separately driven, is arranged to supply field excitation current to the field winding 6 of synchronous generator 1. The output current of exciter 5 is varied by controlling the energization of its shunt connected field winding 7 by means of a pilot exciter 8 which in this case is illustrated as an amplidyne type machine. Exciter 8 also may be direct connected to the main generator and main exciter as shown, or may be separately driven. A variable resistor 9 is provided in series with amplidyne 8 and exciter field 7 for adjusting the main exciter under manual control.

For controlling the output of the amplidyne exciter 8, and consequently the energization of the generator 1 through main exciter 5, there is provided an automatic voltage regulator which is designated generally by the numeral 10. This voltage regulator is responsive to the voltages existing across all three phases of generator 1 and produces a control voltage for energizing a control field winding 11 of amplidyne 8 with a direct current of variable magnitude and polarity for effecting the required changes in the excitation of generator 1 to maintain the terminal voltage of this generator substantially constant.

Included in our regulator system is a reactive kilovolt-ampere responsive circuit 12 which is responsive to reactive kilovolt-amperes in the armature of generator 1. The output of circuit 12 is zero during normal operation of generator 1 and the associated regulator system. If, however, voltage regulator 10 should attempt to reduce the generator excitation sufficiently that the underexcited reactive kilovolt-amperes in generator 1 would be increased enough to cause the generator to be pulled out of synchronism with other machines with which it may be operating in parallel, circuit 12 produces a unidirectional output current which is approximately proportional in magnitude to the increase in underexcited reactive current above the point at which the circuit is set to operate.

Interconnecting reactive kilovolt-ampere responsive circuit 12 and automatic voltage regulator 10 is a recalibrating circuit 13, the operation of which is also explained in detail subsequently. Circuit 13 upon receipt of a predetermined signal from reactive kva. responsive circuit 12 acts to recalibrate the voltage regulator 10 and prevent its reducing the excitation of generator 1 beyond a predetermined value, and it accomplishes this without seriously affecting the sensitivity of the voltage regulator.

Reference is made next to the automatic voltage regulator 10 which includes a positive phase sequence network, frequency compensating means for this network, a non-linear impedance circuit, a linear impedance circuit, and a pair of bridge type full wave rectifiers cumulatively connected to energize control field winding 11 of amplidyne 8. The voltage regulator 10 is connected to the main alternating current conductors 2, 3 and 4 by a T-connected potential transformer 14. The primary of this transformer has its main winding 15 connected across conductors 3 and 4, and has a teaser winding 16 connected between line conductor 2 and the midpoint of main winding 15. The voltage of teaser winding 16 is .866 times the voltage of main winding 15 so that the voltages between the two terminals of the main winding 15 and the free terminal of teaser winding 16 are all equal and all displaced 120°. The secondary of potential transformer 14 differs from the conventional three phase to two phase T-connected transformer in that the two phases of the secondary do not have equal voltages; the phase 17 which is excited by the teaser winding 16 has twice the voltage of phase 18 which is excited by the main primary winding 15, and this latter half-voltage winding is connected to the midpoint of the full-voltage winding of the secondary so as to form a T-connection.

The positive phase sequence network of the voltage regulator includes a resistor 19 and a reactor 20 serially connected across the high voltage secondary winding 17. Resistor 19 and reactor 20 have equal impedance values at the normal frequency of alternating current generator 1. Consequently, the voltage between the junction point 21 of the resistor and the reactor and the point 22 where windings 17 and 18 are interconnected is equal to one-half the voltage of winding 17 and is, therefore, equal to the voltage of winding 18. Thus, the voltage between point 21 and the free terminal 67 of winding 18 will be twice the voltage of the winding 18 or will be zero, depending on whether the voltage between points 21 and 22 is in phase with or in phase opposition to the voltage of winding 16; this depends upon the phase rotation of the main alternating current circuit. The main circuit is assumed to have 2-3-4 phase rotation, and with this phase rotation the voltage between point 21 and free terminal 67 of winding 18 is twice the voltage of winding 18 so that the voltage between these points is a measure of the positive phase sequence voltage of the main circuit so that it will disappear for negative phase sequence voltages. If the main alternating current circuit has the opposite phase rotation, the network will respond to the negative phase sequence voltage of the circuit.

The positive phase sequence network is compensated for variations in frequency by means of a parallel resonant circuit connected across the resistor 19. As shown, this consists of a capacitor 23 and a reactor 24 in the form of a step-up autotransformer. These devices are tuned to resonance at the normal frequency of generator 1 so that they have extremely high net reactance and do not affect the operation of the voltage regulator at normal frequency. If, however, the frequency departs from normal, the frequency compensating circuit is no longer resonant and the departure from resonance compensates for the effect that a change in frequency would otherwise have on voltage regulator 10. The voltage regulator, as explained below, includes a magnetic saturation type non-linear impedance device whose characteristics would be affected by a change in frequency except for the presence of this frequency compensation circuit. The action of the frequency compensating produces no substantial shift in phase of the output voltage of the positive phase sequence network over an appreciable range of variations in frequency.

The voltage regulator 10 includes a circuit having non-linear impedance characteristics and another circuit having linear impedance characteristics, both of which are connected to the frequency compensated positive phase sequence network at terminal 25. The non-linear impedance circuit includes a non-linear impedance device 26 which may, for example, be a saturable core reactor. As shown, this circuit also includes a series capacitor 27 so that the current in the non-linear impedance circuit produces a minimum amount of voltage drop in this circuit, and an adjustable resistor 28 for varying the sensitivity of the automatic voltage regulator. The linear circuit of the voltage regulator includes a linear impedance device 29 which, for example, may be a conventional resistor.

The non-linear impedance circuit is connected to supply a full wave bridge type rectifier 30, and the return circuit from this rectifier is connected to the free terminal 67 of transformer secondary winding 18 through a resistor 31. The linear impedance circuit is connected to supply a second similar full wave bridge type rectifier 32, and the return circuit from the latter rectifier is connected directly to the free terminal 67 of transformer winding 18. The output terminals of rectifiers 30 and 32 are connected with additive or cumulative polarity in a closed series circuit and control winding 11 is connected across this circuit. As long as the output currents of rectifiers 30 and 32 are equal, the control winding 11 is de-energized, but as soon as the output currents of the rectifiers become unequal, the control winding 11 carries the difference between the output currents of the two rectifiers. The direction of flow of this difference current depends upon which of the two rectifiers predominates.

A current limiting resistor 33 and a smoothing reactor 34 may be connected in the common series circuit of the two rectifiers.

During normal operation of generator 1 and exciters 5 and 8, the voltage regulator 10 will maintain the output voltage of generator 1 substantially constant at a value determined by the adjustment of non-linear impedance device 26 for wide variations in load and power factor and for appreciable variations in speed. During such operation, any appreciable increase in voltage of terminal conductors 2, 3 and 4 will cause the current in the non-linear impedance circuit of the regulator to increase more rapidly, that is, by a larger percentage, than the current in the linear impedance circuit. This will cause a predominance by rectifier 30 over rectifier 32 which will circulate a current through control field winding 11 in a direction which causes amplidyne 8 to produce an electromotive force in opposition to the voltage across winding 7. This reduces the excitation provided by main exciter 5 for main generator 1 and reduces the terminal voltage of the latter until it is restored to the desired predetermined value.

An initial reduction in the output voltage of generator 1 produces an opposite response from regulator 10 and rectifier 32 predominates over rectifier 30 to produce a current through control field 11 in the opposite direction to that considered in the preceding paragraph. This causes amplidyne 8 to boost the excitation of exciter 5 and increase the terminal voltage of generator 1 until it is restored to the predetermined normal value. There is connected in circuit with control field winding 11 a secondary winding 39 of a stabilizing transformer 36. The primary 37 of this transformer is connected across the output terminals of main exciter 5 so that changes in the output voltage of the exciter will induce voltages in transformer 36. The secondary 39 of this transformer is connected in a direction such that the voltages produced therein counteract the changes in exciter voltage which produce them and thus prevent over-shooting or hunting of the voltage regulator.

The voltage regulator 10 will thus operate to maintain the voltage of generator 1 at the desired predetermined value irrespective of the load, either real or reactive, on generator 1. In the event of a disturbance on the interconnected system, the voltage of generator 1 may tend to rise, and the action of the voltage regulator 10 will be to reduce the excitation of the exciters and of the main generator in an attempt to reduce the excitation of the generator 1 sufficiently to restore normal voltage. If a lower limit of excitation is not provided, this excitation reducing action might, under some abnormal conditions, continue until the excitation of the main generator is reduced to a point where synchronizing torque is lost and the generator pulls out of synchronism with the interconnected system.

In order to insure that the excitation of generator 1 is not lowered to this dangerous level, reactive kva. responsive circuit 12 and recalibrating, or limiting, circuit 13 are utilized to affect the operation of voltage regulator 10 when the main generator is approaching pull out conditions as indicated by the amount of reactive kva. being supplied by the generator. The amount of reactive kilovolt-amperes which must be maintained varies with the impedance of the external circuit being supplied by the generator and the load which the generator is carrying, and our regulator system provides for a variable limiting value of reactive kva., variable inversely with the amount of load which the generator is carrying. This limiting value approximates closely but is always slightly less than the maximum value of reactive kva. at pull out for all values of real power load on the generator regardless of the external impedance.

The reactive kilovolt-ampere responsive circuit 12, which is utilized in obtaining the desired limiting characteristics, is energized through a transformer 40 whose primary winding 41 is connected between main line conductors 2 and 4. The secondary winding 42 of transformer 40 is provided with a plurality of taps such as A, B, C, D and E. As illustrated, the points B and D are connected to opposite ends of primaries of the two series connected isolating transformers 43 and 44. Connected between tap E and the mid point 45 of the primary windings of transformers 43 and 44 is a circuit having a resistor 46 and a variable value reactor 47 connected in series. A current transformer 48 connected in line 3 of the main generator has its output terminals connected across this resistor-reactor combination. The resistor 46 in conjunction with the tap E selected on transformer 40 determines the reactive kva. limit, while the adjustable tap 49 on reactor 47 is employed for compensating the reactive kva. responsive circuit for impedance in the external system to which generator 1 may be connected.

The secondary windings of transformers 43 and 44 are connected respectively to the alternating current input terminals of a pair of full wave bridge type rectifiers 50 and 51. The unidirectional current output terminals of rectifiers 50 and 51 are electrically connected with opposing polarity. Each of the rectifiers 50 and 51 is provided with filter means such as parallel connected reactor 52 and capacitor 53 for the former and parallel connected reactor 54 and capacitor 55 for the latter, for the rectified output currents. Each of the rectifiers is also provided with preloading means such as resistor 56 for rectifier 50 and resistor 57 for rectifier 51.

The saturating winding 59 of a voltage recalibrating saturable reactor 58 is connected to be energized by the difference in output voltages of rectifiers 50 and 51, the polarity of this voltage depending upon which of these two rectifiers predominates. A half-wave rectifier 60 is connected in circuit with saturating winding 59, however, so that the flow of current through this winding is permitted in only one direction, this being when the output voltage of rectifier 50 exceeds that of rectifier 51. A second half-wave rectifier 61 is connected in shunt with winding 59 and rectifier 60 and allows the flow of current in the opposite direction, for a purpose which is explained below.

Also connected in circuit with saturating winding 59 are a sensitivity adjusting variable resistor 62 and secondary winding 38 of stabilizing transformer 36.

During normal operation of our regulator system, the output voltage of rectifier 51 predominates over that of rectifier 50 and negligible current flows through winding 59 because of the blocking action of rectifier 60. When the excitation of generator 1 approaches the desired lower limit, the output voltage of rectifier 50 becomes greater than that of rectifier 51 and a current flows through saturating winding 59. For proper limiting action, a current should flow through winding 59 only when the average output voltage of rectifier 50 exceeds the average output voltage of rectifier 51. Filters 52, 53 and 54, 55 are provided to prevent spurious response due to the flow of current when the average voltage of rectifier 50 is less than that of rectifier 51. Without these filters such spurious action might result because of the characteristics of transformers 43 and 44 and rectifiers 50 and 51. There is inherently a difference in phase angle of the voltages from transformers 43 and 44. At the same time, the output unidirectional voltages of rectifiers 50 and 51 are full wave rectified sinusoidal waves. When such waves are connected in opposition and have a phase difference there may be regions in which the peak voltage of rectifier 50 exceeds that of rectifier 51 even though the average voltage of rectifier 50 is less than that of rectifier 51 and current might flow in these regions. The filters eliminate this possibility and thereby prevent spurious operating signals from this source.

Half-wave rectifiers 60 and 61 make it possible to preload rectifiers 50 and 51 by means of resistors 56 and 57. Rectifier bridges 50 and 51 are preferably composed of four dry type half-wave rectifier units each. These rectifiers may, for example, be of the selenium type, and such rectifiers must be preloaded so that their currents exceed an inherent initial high resistance range to secure operation in a lower resistance range which is reached when the rectifiers are carrying at least a predetermined amount of current. Without rectifier 60 only bridge rectifier 51 could be preloaded and it would be necessary to eliminate preloading resistor 56 for bridge rectifier 50 because of the necessity for allowing the flow of current in only one direction through saturating winding 59. With rectifier 60 in circuit with winding 59, preloading resistor 56 can be added to preload bridge rectifier 50 to the desired operating range.

Rectifier 61 is provided to prevent the occurrence of a back voltage across rectifier 60 large enough to damage this rectifier, which is also preferably of the dry type. At the same time, rectifier 61, which is likewise preferably of the dry type, also acts to load further bridge rectifiers 50 and 51, and when the output of rectifier 51 exceeds that of rectifier 50 it reduces their difference voltage by internal impedance drop. During limiting action, when the output of bridge rectifier 50 exceeds that of bridge rectifier 51, the presence of a relatively high impedance current consuming device, such as saturating winding 59, in the circuit prevents a high back voltage being applied to rectifier 61.

It should perhaps be pointed out that bridge rectifiers 50 and 51, in the normal case, contain a relatively large number of rectifier plates in each of the four half wave elements because of the voltage requirements of the circuits in which they are connected. Half-wave rectifiers 60 and 61 are preferably composed of a single disk each, having relatively low impedance. A larger number of disks in rectifier 60 would reduce the sensitivity of the system at the reactive kva. value where limiting action starts, because of the high rectifier impedance at low currents. This would make the point where limiting action starts less well defined and the limit would be more difficult to adjust. A larger number of disks would also reduce sensitivity in the full limiting region because of the higher series impedance. Rectifier 61 should have as few disks as possible to minimize the back voltage on rectifier 60, that is, the voltage during the alternate half cycles when rectifier 60 is not conducting. The fact that only one or a minimum of disks are used for rectifiers 60 and 61 makes it important to make certain that the back voltage of these half-wave rectifiers does not reach a value which would damage them.

The winding 38 of stabilizing transformer 36 introduces into the circuit of saturating winding 59 a transient voltage which opposes any change which takes place in the regulator system as a result of changes in the current in saturating winding 59 and thereby aids in preventing hunting in the same manner as transformer winding 39 in circuit with control field winding 11.

The alternating current load windings 65 and 66 of saturable reactor 58 are serially connected between the free terminal 67 of transformer secondary winding 18, at which point one terminal of resistor 31 is also connected, and terminal 68 of winding 17, which is at the junction between reactor 20 and the higher voltage transformer secondary winding 17. Also connected in series in this circuit are the primary and secondary windings 63 and 64 of transformer 62. The junction of transformer windings 63 and 64 is connected to the other terminal of resistor 31 so that resistor 31 is connected in shunt with load windings 65 and 66 of the saturable core reactor and transformer winding 64.

The flow of unidirectional current from kilovolt-ampere responsive circuit 12 increases the saturation of the magnetizable core of device 58 and thereby reduces the impedance of load windings 65 and 66. This increases the voltage drop across resistor 31 which reduces the voltage applied to the non-linear circuit of the voltage regulator 10. The reduction in voltage applied to the non-linear circuit is approximately proportional to the unidirectional current in the saturating winding 59, and the latter is proportional to the increase in under-excited reactive current in generator 1 beyond the predetermined limit. Therefore, when the kilovolt-ampere responsive circuit 12 goes into operation the terminal voltage of generator 1 is increased approximately proportionally to an increase in reactive current in the under-excited direction.

It has been demonstrated that the under-excited reactive amperes at pull out of an alternating current generator are approximately proportional to the generator terminal voltage if the generator is assumed to be connected to a load of zero impedance. Our regulator provides for adjusting the generator terminal voltage in accordance with this relation so that it increases proportionally with the under-excited ampere current as the latter increases beyond the predetermined limit.

The voltage recalibrating circuit 13 provides a sensitive means of recalibrating the voltage regulator 10 in accordance with the unidirectional output current of the reactive kva. responsive circuit 12 in order to overcome the normal action of the voltage regulator and produce an increase in excitation of the generator and thereby limit the reactive current in the generator armature. The sensitivity of recalibrating circuit 13 is a measure of the rate at which this circuit can recalibrate the voltage regulator 10 as a function of the output current of reactive kilovolt-ampere responsive circuit 12. Transformer 62 connected as shown and having a 1:1 ratio between the primary and secondary windings results in this rate being doubled for a particular saturable reactor, thus doubling the limit sensitivity.

In Fig. 2 of the drawing is shown a schematic diagram of the recalibrating circuit to facilitate an understanding of its operation. This circuit is energized by connection between free terminal 67 of secondary winding 18 of the T-connected transformer 14 and free terminal 68 of winding 17. The voltage drop across resistor 31 can be expressed by the relation $$(1) \quad \bar{E}_R = \frac{\bar{E}_1 R(1+K)}{R(1+K)^2 + jXK^2}$$

where $E_R$ = the voltage drop across resistor 31
$E_1$ = the voltage between terminals 67 and 68
$R$ = the resistance of resistor 31
$K$ = the transformer ratio, that is, the turn ratio between primary winding 63 and secondary winding 64 of transformer 62
$X$ = the inductive impedance of load windings 65 and 66 of saturable core reactor 58

In the region of normal operation, X is greater than four times R. Equation 1 can, therefore, be reduced to the approximate expression $$\bar{E}_R = \frac{\bar{E}_1 R(1+K)}{jXK^2}$$

Thus, if $K=1$, a given incremental change in the value of X will cause twice the change in $\bar{E}_R$ due to the transformer feedback as would be the case if the transformer were not used. If K were made greater than 1, the gain would be correspondingly reduced from the value of 2 which is obtained with a 1:1 transformer turn ratio. If K is reduced below 1, an increase in gain results, but with a corresponding sacrifice of linearity of response of the recalibrating circuit. We have found that a value of $K=1$ is the optimum value for most conditions of operation.

The voltage drop $\bar{E}_R$ across resistor 31 is almost 90° out of phase with voltage $\bar{E}_1$ between terminals 67 and 68. The latter voltage in turn is 45° out of phase with the voltage between terminals 21 and 67 which is utilized to energize the non-linear resonant circuit. The result is that the phase difference between the voltage drop across resistor 31 and that of the non-linear circuit is equal to the difference between these two, or less than 45°, and satisfactory operation results.

While we have illustrated and described a preferred embodiment of our invention, modifications thereof may be made by those skilled in the art. Therefore, it should be understood that we intend to cover by the appended claims any such modifications which fall within the true spirit and scope of our invention.

What we claim as new and desire to secure by Letters Patent of the United States is:

1. A regulating system for a synchronous alternating current dynamoelectric machine having a field winding comprising, excitation means for said field winding, automatic regulating means for controlling said field excitation means, reactive kilovolt-ampere responsive means responsive to a predetermined value of reactive kilovolt-amperes in said dynamoelectric machine, and recalibrating means controlled by said reactive kilovolt-ampere responsive means for limiting the field excitation reducing action of said regulating means, said reactive kilovolt-ampere responsive means including a pair of rectifiers having their unidirectional output potentials connected in opposition to each other, connections for energizing said recalibrating means with a voltage responsive in magnitude and polarity to the difference between said output potentials, preloading means for said rectifiers, filter means for the output currents of said rectifiers, and a third rectifier connected in circuit with said recalibrating means to permit the flow of current in said circuit only when the output potential of a predetermined one of said first two rectifiers predominates over the output potential of the other.

2. A regulating system for a synchronous alternating current dynamoelectric machine having a field winding comprising, excitation means for said field winding, automatic regulating means for controlling said field excitation means, reactive kilovolt-ampere responsive means responsive to a predetermined value of reactive kilovolt-amperes in said dynamoelectric machine, and recalibration means controlled by said reactive kilovolt-ampere responsive means for limiting the field excitation reducing action of said regulating means, said recalibrating means affecting said regulating means inversely to vary the maximum value of reactive kilovolt-ampere in said machine with the value of power produced thereby, said reactive kilovolt-ampere responsive means including a pair of rectifiers having their unidirectional output potentials connected in opposition to each other, connections for energizing said recalibrating means with a voltage responsive in magnitude and polarity to the difference between said output potentials, preloading means for said rectifiers, filter means for the output currents of said rectifiers, transient responsive means responsive to changes in the excitation of said alternating current dynamoelectric machine for affecting the energization of said recalibrating means, a third rectifier connected in circuit with said recalibrating means to permit the flow of current in said circuit only when the output potential of a predetermined one of said first two rectifiers predominates over the output potential of the other, and a fourth rectifier connected in shunt with said recalibrating means and said third rectifier and arranged to permit the passage of current in the opposite direction from the current therethrough in order to minimize the back voltage across said third rectifier.

3. A regulating system for a synchronous alternating current dynamoelectric machine having a field winding comprising, excitation means for said field winding, automatic regulating means including a circuit having a linear impedance characteristic and a circuit having a non-linear impedance characteristic for controlling said field excitation means, reactive kilovolt-ampere responsive means responsive to a predetermined value of reactive kilovolt-amperes in said reactive kilovolt-ampere responsive means responsive to a predetermined value of reactive kilovolt-amperes in said dynamoelectric machine, said reactive kilovolt-ampere responsive means including a pair of rectifiers having their unidirectional output potentials connected for applying to said saturating winding a voltage responsive in magnitude and polarity to the difference between said output potentials, preloading means for said rectifiers, filter means for the output currents of said rectifiers, transient responsive means responsive to changes in the excitation of said alternating current dynamoelectric machine for affecting the energization of said saturating winding, a third rectifier connected in circuit with said saturating winding to permit the flow of current in said winding only when the output potential of the predetermined one of said first two rectifiers predominates over the output potential of the other, and a fourth rectifier connected in shunt with said saturating winding and said third rectifier and arranged to permit the passage of current in the direction opposite to the current through the saturating winding and the third rectifier.

4. A regulating system for a synchronous alternating current dynamoelectric machine having a field winding comprising, excitation means for said field winding, automatic regulating means including a circuit having a linear impedance and a circuit having a non-linear impedance for controlling said field excitation means, recalibrating means connected to one of said circuits for affecting said regulating means to limit the field excitation reducing action of said regulating means, said recalibrating means including a saturable core reactor having a saturating winding, and generator excitation below a predetermined value, and means responsive to a predetermined reactive power in said machine armature less than the maximum reactive power in said machine armature at which said machine pulls out of synchronism for controlling said recalibrating means, said reactive power responsive means including a pair of rectifiers having their unidirectional output potentials connected in opposition to each other, connections for applying to said recalibrating means a voltage responsive in magnitude and polarity to the difference between said output potentials, preloading means for said rectifiers, filter means for the output currents of said rectifiers, transient responsive means responsive to changes in the output of said dynamoelectric exciter for affecting the energization of said recalibrating means, and a third rectifier connected in circuit with said recalibrating means to permit the flow of current in said circuit only when the output potential of a predetermined one of said first two rectifiers exceeds the output potential of the other.

5. A regulating system for a synchronous dynamoelectric machine having an armature and a direct current field winding comprising, a dynamoelectric exciter for supplying excitation potential to said field winding, automatic regulating means for regulating the output of said exciter to maintain substantially constant the terminal voltage of said dynamoelectric machine, said regulating means including a circuit having a linear impedance characteristic and a circuit having a non-linear impedance characteristic, recalibrating means connected to one of said circuits for affecting said regulating means to prevent reduction in dynamoelectric machine, means connected in one of said circuits and controlled by said reactive kilovolt-ampere responsive means for limiting the field excitation reducing action of said regulating means, said last-named means affecting said regulating means inversely to vary the maximum value of reactive kilovolt-amperes with the value of power developed by said machine, said reactive kilovolt-ampere responsive means including a pair of rectifiers having their unidirectional output potentials connected in opposition to each other, connections for energizing said limiting means with a voltage responsive in magnitude and polarity to the difference between said output potentials, preloading means for said rectifiers, filter means for the output currents for said rectifiers, transient responsive means responsive to changes in the excitation of said alternating current dynamoelectric machine for affecting the energization of said limiting means, and a third rectifier connected in circuit with said limiting means to permit the flow of current in said circuit only when the output potential of a predetermined one of said first two rectifiers is greater that the output potential of the other.

6. A regulating system for a synchronous dynamoelectric machine having an armature and a direct current field winding comprising, a dynamoelectric exciter for supplying excitation to said field winding, automatic regulating means for controlling the output of said exciter to maintain constant the terminal voltage of said machine, said regulating means including a circuit having a linear impedance and a circuit having a non-linear impedance, resistor means connected in one of said circuits for affecting said regulator to prevent reduction in generator excitation below a predetermined value, a saturable core reactor provided with a saturating winding and arranged to affect the voltage drop across said resistor, and reactive power responsive means for energizing said saturating winding, said reactive power responsive means being responsive to a predetermined value of reactive power in said armature below a predetermined maximum value at which said machine pulls out of synchronism for controlling the energization of said saturating winding so as to maintain the excitation of said machine above a corresponding predetermined value, said reactive power responsive means including a pair of rectifiers having their unidirectional output potentials connected in opposition to each other for differentially applying to said saturating winding a voltage responsive in magnitude and polarity to the difference between said output potentials, preloading means for said rectifiers, filter means for the output currents of said rectifiers, transient responsive means responsive to changes in the output of said dynamoelectric exciter for affecting the energization of said saturating winding, a third rectifier connected in circuit with said saturating winding to allow the flow of current in said winding only when the output potential of a predetermined one of said first two rectifiers predominates over the output potential of the other, and a fourth rectifier connected in shunt with said saturating winding and said third rectifier arranged to allow the passage of current in the opposite direction from the current through the saturating winding and the third rectifier.

7. A regulating system for a synchronous dynamoelectric machine having an armature and a direct current field winding comprising, a dynamoelectric exciter for supplying excitation to said field winding, automatic regulating means for controlling the output of said dynamoelectric exciter to maintain constant the terminal voltage of said machine, said regulating means including a circuit having a linear impedance and a second circuit having a non-linear impedance, a T-connected transformer having a three phase primary winding and a two phase secondary winding, said primary winding being energized by a voltage responsive to said terminal voltage, one of the phases of said secondary winding having half the voltage of the other and having one terminal thereof connected to the mid point of said other phase, a resistor and a reactor of approximately equal impedance at the normal frequency of said machine connected in series across said other secondary phase, said linear circuit and said non-linear circuit both being connected between the free terminal of the lower voltage secondary phase and the junction of said resistor and said reactor, a voltage recalibrating resistor connected in said non-linear circuit for affecting said regulator to prevent a reduction in the excitation of said machine below a predetermined value, a saturable core reactor having alternating current load windings and a unidirectional current saturating winding, said load windings being connected between the free terminal of said lower voltage secondary phase and one of the free terminals of the other secondary phase, a two winding transformer having both windings serially connected in circuit with said saturable reactor load windings, the common connection of said transformer windings being connected electrically to said non-linear circuit at a point such that one winding of said two winding transformer and the load windings of said saturable reactor are connected in shunt with said resistor, and means responsive to a predetermined reactive power in said machine armature less than the maximum reactive power in said machine armature at which said machine pulls out of synchronism for energizing said saturating winding, said reactive power responsive means including a pair of dry type bridge rectifiers having their unidirectional output potentials connected in opposition to each other, connections for differentially applying to said saturating winding a voltage responsive in magnitude and polarity to the difference between said output potentials, a pair of preloading resistors for said rectifiers connected respectively across the output terminals thereof, separate filter means for the output currents of said rectifiers connected respectively in the output circuits thereof, a stabilizing transformer having its primary connected to be energized by current changes in the output of said dynamoelectric exciter, the secondary winding of said stabilizing transformer being connected in circuit with said saturating winding, a third dry type rectifier connected in circuit with said saturating winding to allow the flow of current in said winding only when the output potential of a predetermined one of said first two rectifiers predominates over the output potential of the other, and a fourth dry type rectifier connected in shunt with said saturating winding and said third rectifier and arranged to permit the passage of current in a direction opposite to the current through the saturating winding and the third rectifier in order to minimize the back voltage across said third rectifier.

8. A regulating system for a synchronous dynamoelectric machine having an armature and a direct current field winding comprising, a dynamoelectric exciter for supplying excitation to said field winding, automatic regulating means for controlling the output of said dynamoelectric exciter to maintain constant the terminal voltage of said machine, said regulating means including a circuit having a linear impedance and a second circuit having a non-linear impedance, a T-connected transformer having a three phase primary winding and a two phase secondary winding, said primary winding being energized by a voltage responsive to said terminal voltage, one of the phases of said secondary winding having half the voltage of the other and having one terminal thereof connected to the mid point of said other phase, a resistor and a reactor of approximately equal impedance at the normal frequency of said machine connected in series across said other secondary phase, said linear circuit and said non-linear circuit both being connected between the free terminal of the lower voltage secondary phase and the junction of said resistor and said reactor, a voltage recalibrating resistor connected in said non-linear circuit for affecting said regulator to prevent a reduction in the excitation of said machine below a predetermined value, a transformer having two windings, said recalibrating resistor being connected in series with one of said windings between said free terminal of the lower voltage secondary phase and a free terminal of the higher voltage secondary phase, a saturable core reactor having alternating current load windings and a unidirectional current saturating winding, said alternating current windings and the other winding of said transformer beng serially connected in shunt with said recalibrating resistor, and means responsive to a predetermined value of reactive power in said machine armature for energizing said saturating winding.

9. A regulating system for a synchronous alternating current dynamoelectric machine comprising, automatic regulating means for controlling the terminal voltage of said machine, means responsive to the reactive kilovolt-amperes in said dynamoelectric machine, and recalibrating means controlled by said reactive kilovolt-ampere responsive means for limiting the terminal voltage reducing action of said automatic regulating means under certain conditions, said recalibrating means including connections to a source of alternating potential, a resistor, a transformer having two windings, said resistor being connected in series with one of said windings for energization by said alternating potential, a saturable core reactor having at least one alternating current winding and a direct current saturating winding, said alternating current winding and the other winding of said transformer being serially connected in shunt with said resistor, said saturating winding being connected to said reactive kilovolt-ampere responsive circuit whereby this circuit controls the current in the saturating winding.

10. An electrical circuit comprising, connections to a first source of alternating potential of predetermined frequency, a resistor, connections to a second source of alternating potential of the same frequency as said first source but shifted in phase therefrom, a circuit including said resistor energized by said second source of alternating potential, a transformer having two windings, said resistor being also connected in series with one of said windings for energization by said first source of alternating potential, a saturable core reactor having at least one alternating current winding and a direct current saturating winding, said alternating current winding and the other winding of said transformer being serially connected in shunt with said resistor, and means for varying the current in said saturating winding to vary the potential drop across said resistor.

11. An electrical circuit comprising, connections to a source of alternating potential, a resistor, a transformer having two windings, said resistor being connected in series with one of said windings for energization by said alternating potential, a saturable core reactor having at least one alternating current winding and a direct current saturating winding, said alternating current winding and the other winding of said transformer being serially connected in shunt with said resistor, and means separate from said source for varying the current in said saturating winding to vary the potential drop across said resistor.

12. An electrical circuit comprising, connections to a source of alternating potential, a resistor, a transformer having two windings, said resistor being connected in series with one of said windings for energization by said alternating potential, a saturable core reactor having at least one variable inductance alternating current winding, said alternating current winding and the other winding of said transformer being connected in shunt with said resistor, and means separate from said source for varying the saturation of the said core whereby to vary the potential drop across said resistor.

References Cited in the file of this patent

UNITED STATES PATENTS

| | | |
|---|---|---|
| 2,101,207 | Williamson | Dec. 7, 1937 |
| 2,138,732 | Craig | Nov. 29, 1938 |
| 2,454,211 | Rustebakke et al. | Nov. 16, 1948 |
| 2,472,571 | Crary | June 7, 1949 |

FOREIGN PATENTS

| | | |
|---|---|---|
| 481,517 | Great Britain | Mar. 11, 1938 |